United States Patent
Chua (10) Patent No.: US 9,856,896 B2
(45) Date of Patent: Jan. 2, 2018

(54) CABLE LOCK AND SEAL DEVICE

(71) Applicant: MEGA FORTRIS (MALAYSIA) SDN. BHD., Shah Alam, Selangor (MY)

(72) Inventor: Yuen Kam Chua, Shah Alam (MY)

(73) Assignee: MEGA FORTRIS (MALAYSIA) SDN. BHD., Shah Alam (MY)

( * ) Notice: Subject to any disclaimer, the term of this patent is extended or adjusted under 35 U.S.C. 154(b) by 0 days.

(21) Appl. No.: 15/117,193

(22) PCT Filed: Feb. 5, 2015

(86) PCT No.: PCT/MY2015/000008
§ 371 (c)(1),
(2) Date: Aug. 6, 2016

(87) PCT Pub. No.: WO2015/119494
PCT Pub. Date: Aug. 13, 2015

(65) Prior Publication Data
US 2016/0356292 A1     Dec. 8, 2016

(30) Foreign Application Priority Data
Feb. 7, 2014  (MY) ........................ PI 2014700257

(51) Int. Cl.
*F16B 2/12*      (2006.01)
*F16G 11/14*    (2006.01)
(Continued)

(52) U.S. Cl.
CPC .................. *F16B 2/12* (2013.01); *F16B 2/08* (2013.01); *F16G 11/106* (2013.01); *F16G 11/14* (2013.01); *G09F 3/0323* (2013.01); *G09F 3/0352* (2013.01)

(58) Field of Classification Search
CPC .. F16B 2/08; F16B 2/12; F16G 11/106; F16G 11/14; G09F 3/0323; G09F 3/0352
See application file for complete search history.

(56) References Cited

U.S. PATENT DOCUMENTS 4,074,916 A * 2/1978 Schindler .............. G09F 3/0358
                                                           24/115 H
4,640,538 A    2/1987 Brammall
(Continued)

FOREIGN PATENT DOCUMENTS

| EP | 0630450 B1 | 5/1996 |
| EP | 1172781 A1 | 1/2002 |
| WO | 01/38756 A | 5/2001 |

*Primary Examiner* — Robert Sandy
*Assistant Examiner* — David M Upchurch
(74) *Attorney, Agent, or Firm* — Maschoff Brennan (57) ABSTRACT

A cable lock and seal device with features preventing the locking mechanism from engaging the cable fibers too tightly to cut or fray is disclosed. A conventional device is made up of a body (10) and a cover (20) halves to complementarily form a block enclosing therewithin a passage (30) and a chamber (50). The body (10) is integrally formed with an anchor block (12) in which one end of a cable (14) is anchored. The other free end of the cable (14) may be inserted into the passage (30) which is preferably curved upward in traversing the assembled body-and-cover block. The chamber (50) is adapted with a ramp (52) rising towards the passage (30), a slot (54) for retaining a spring (56) which second end is disposed to urge a locking wheel (53) up the ramp (52) against the passage (30). The improvement lies in providing a rib (51) along the lower wall of the passage (30) proximal to the top end of the ramp (32) so that the urging of the locking wheel (53) by the biasing means (56 or 58) up the ramp (52) is restrained when the locking wheel's axle (55) engages the rib (51) and limits the wheel (53)'s further entry into the passage (30) upon having sufficiently engag- (Continued)

ing the cable (14). While preventing the wheel edge from over-engaging and cutting the cable fibers it also prevents the withdrawal of the inserted cable.

9 Claims, 6 Drawing Sheets

(51) Int. Cl.
*F16G 11/10* (2006.01)
*G09F 3/03* (2006.01)
*F16B 2/08* (2006.01)

(56) References Cited

U.S. PATENT DOCUMENTS

| | | | | |
|---|---|---|---|---|
| 5,352,003 A | * | 10/1994 | Bystry | G09F 3/0352 |
| | | | | 292/252 |
| 5,538,300 A | * | 7/1996 | Brown | G09F 3/0352 |
| | | | | 24/136 A |
| 5,611,583 A | * | 3/1997 | Bystry | G09F 3/0358 |
| | | | | 24/136 A |
| 5,647,620 A | * | 7/1997 | Kuenzel | B65D 55/06 |
| | | | | 292/307 R |
| 5,820,176 A | * | 10/1998 | Leon | F16G 11/14 |
| | | | | 292/323 |
| 6,131,969 A | | 10/2000 | Natkins | |
| 6,345,847 B1 | * | 2/2002 | Dreisbach | G09F 3/0352 |
| | | | | 292/252 |
| 6,550,830 B2 | * | 4/2003 | Kueznel | G09F 3/037 |
| | | | | 292/307 R |
| 6,578,886 B1 | * | 6/2003 | Bystry | G09F 3/037 |
| | | | | 292/307 R |
| 6,719,335 B2 | * | 4/2004 | Velschou | G09F 3/0352 |
| | | | | 292/307 R |
| 8,001,660 B2 | * | 8/2011 | Cai | F16G 11/14 |
| | | | | 24/115 H |
| 8,578,566 B2 | * | 11/2013 | Jolly | F16G 11/106 |
| | | | | 24/136 A |
| 2006/0196016 A1 | | 9/2006 | Cai et al. | |
| 2011/0041292 A1 | | 2/2011 | Jolly et al. | |

* cited by examiner

CABLE LOCK AND SEAL DEVICE

TECHNICAL FIELD

This invention generally relates to cable lock and seal devices wherein a cable is used to shackle an opening to be locked, whereby the ends of the cable are secured in the lock body. In particular, it relates to certain improvements to the mechanism of engaging and immobilizing the cable inserted into the lock body by a spring-biased locking wheel, and to the inclusion of certain anti-picking features into the lock mechanism.

BACKGROUND ART

A cable lock may also be used as an anti-tampering seal device (hence, the term "cable lock and seal device" is used) whereby the cable needs to be cut to break the seal and open the lock. A typical prior art cable lock and seal device is disclosed in European Patent No. EP-0,630,450-B1 (Blair Security Products). In this prior art device, a spring biases a locking wheel against the cable inserted into a straight passageway. The locking wheel is guided by a ramp up to passageway such that insertion of the cable will push locking wheel down the ramp and eases the wheel's engagement against the cable and allow the cable to continue to be inserted to tighten the shackle or to reduce cable slack. Withdrawing the cable, however, would result in the frictional engagement of locking wheel being pushed up the ramp into the passageway, thus locking and preventing the cable from being withdrawn.

When used in heavy-duty applications such as locking and sealing container doors, the device is often subject to heavy stress and the cable being tugged harshly by truck operators and movers as well as by the heavy container doors the devices are supposed to lock. As a result, the locking wheel is often pushed up the ramp into the passageway to engage the cable beyond frictional engagement. The excess force in repeated tugging or pulling the cable in withdrawal direction thus results in the locking wheel teeth biting and shearing into the cable threads resulting in individual cable threads being cut or frayed.

Relevant to the manner in which the locking wheel engages and locks the cable is the design or configuration of teeth on the periphery of the wheel. As shown in International Published Application No. WO 2001/38756 (Bloxwich Engineering) different teeth configurations may be provided to engage the longitudinal surface profile of the cable's braided strands. In U.S. Pat. No. 4,640,538 (Brammall), the teeth are simply provided to engage the individual strands of thread of the bundled and braided cable regardless of the bundles' profile and twist. In U.S. Pat. No. 6,131,969 (Natkins), the teeth are not provided in form of a locking wheel but in a linear row and with increasing height to narrow down to tighten upon the cable. The teeth profile are in the form of caliper-like jaws within which two bundles of a 7-bundle braided cable may be grasped and locked. None of the above prior art cable engaging and locking means discloses a teeth design which engages both individual strands and collective bundle of strands that are braided to form the cable.

Another aspect to be considered is the cable passageway in the device. Most of the prior art devices, including EP-0,630,450-B1, provide for the passageway to be marginally fit for the cable to pass through. Such a straight and fitting passage might allow for a straight pick attack in which a slim pick may be inserted along the engaged cable to reach and push locking wheel away or downwardly to ease the locking engagement and thus loosen the cable and allowing it to be withdrawn or reversed its insertion.

From the above described disadvantages of the prior art, it would be desirable for a lock and seal device to have a cable engaging mechanism which limits the shear by the locking wheel on the cable. It would also be desirable that the cable surface engaging means of the locking mechanism be configured such that its teeth or projections engage the longitudinal surface profile of the cable. It would further be advantageous to provide for features on the cable passageway that guard against picking to loosen the locking wheel's engagement and unlock the cable.

SUMMARY OF DISCLOSURE

The general embodiment of our invention provides for a cable lock and seal device comprising a body and a cover with which complementarily forming a block enclosing there within at least a passage and a chamber, wherein the body is integral with a base in which one end of a cable may be secured, and the other end of the cable being free to be inserted into the passage. The passage traverses the assembled body- and-cover block. The chamber is adapted with a ramp rising towards said passage, a slot for retaining a first end of a biasing means which second end is disposed to urge a locking wheel up the ramp against said passage. The locking wheel has an axle. A rib is provided on at least one side of chamber wall whereby the urging of the locking wheel by the biasing means up the ramp is restrained when the locking wheel's axle engages said rib to limit said locking wheel further entry into the passage upon sufficiently engaging said cable and preventing its withdrawal by reversing its insertion.

In one aspect of our device, the insertion of the cable into the passage pushes the locking wheel down the ramp against the biasing means thereby disengaging the passage and unlocking and allowing for the continued insertion of said cable. The withdrawal of the cable, by reversing its insertion, entails frictional engagement of the locking wheel whereby said locking wheel is urged up the ramp to encroach into the passage and engage to lock the cable from further withdrawal or reversing the direction of cable insertion.

In a second aspect, the passage traverses the body-and-cover block in an inwardly curved pathway, which preferably is linearly comprised of a curved ingress passageway, followed by a straight passageway and a curved egress passageway. The ingress passageway has a diameter significantly larger than that of the cable diameter. Preferably, the ingress passageway is adapted such that the ingress opening is marginally wider than the diameter of the cable and the remaining ingress passageway significantly larger up to the straight passageway where it is abruptly narrowed to marginally admit said cable diameter. The abrupt narrowing of the passageway at the entrance to the straight passageway is preferably defined by a vertical wall projecting from the lower periphery of the opening to the straight passageway.

In a third aspect, an indentation for embedding an electronic tracking means is optionally provided on an external surface of the assembled device. Additionally, a sheath may be formed by moulding a layer of polymeric material over a substantial portion of said device body and wrap over the embedded electronic tracking means to secure it to the device. In a preferred embodiment, the locking wheel circumference surface is configured with teeth to engage corresponding cable's longitudinal surface profile. The teeth configuration may comprised of a combination of small teeth distributed to engage inter-strands and large teeth distributed to engage inter-bundles of the cable.

LIST OF ACCOMPANYING DRAWINGS

The drawings accompanying this specification as listed below may provide a better understanding of our invention and its advantages when referred to in conjunction with the detailed description that follows as exemplary and non-limiting embodiments of our cable lock and seal device:

FIG. 1 shows one embodiment of the open body portion of our cable lock and seal device, whereas

DETAILED DESCRIPTION OF [SPECIFIC/PREFERRED] EMBODIMENTS

The general embodiment of our cable lock and seal device may be described in detail with reference to the illustrations of FIG. 1 and FIG. 2 in which the device is shown opened up into its body portion (10) and the cover portion (20). The removable components forming the locking mechanism have not yet been inserted into the body (10). The placing of the cover (20) on the body (10) will complementarily form a block enclosing a passage (30) and a chamber (50) within the device. The body (10) is integrally formed with a base (12) in which one end of a cable (14) may be secured or securely anchored (not shown). The terminal end of the cable (14) may be permanently anchored in the base (12) by various conventional means, including melding the casing block material with the cable (14) to fill up "scallop" spaces such as that described in EP-06304450. The free end of the cable (14) may be inserted into the passage (30) of the device.

Figure 1:
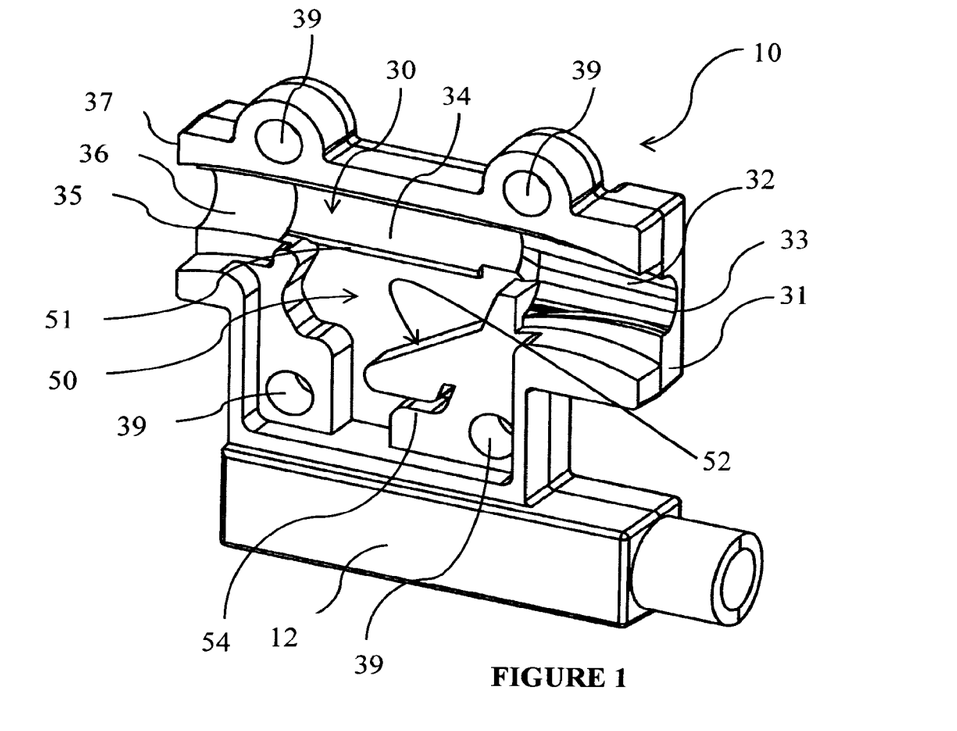
Figure 2:
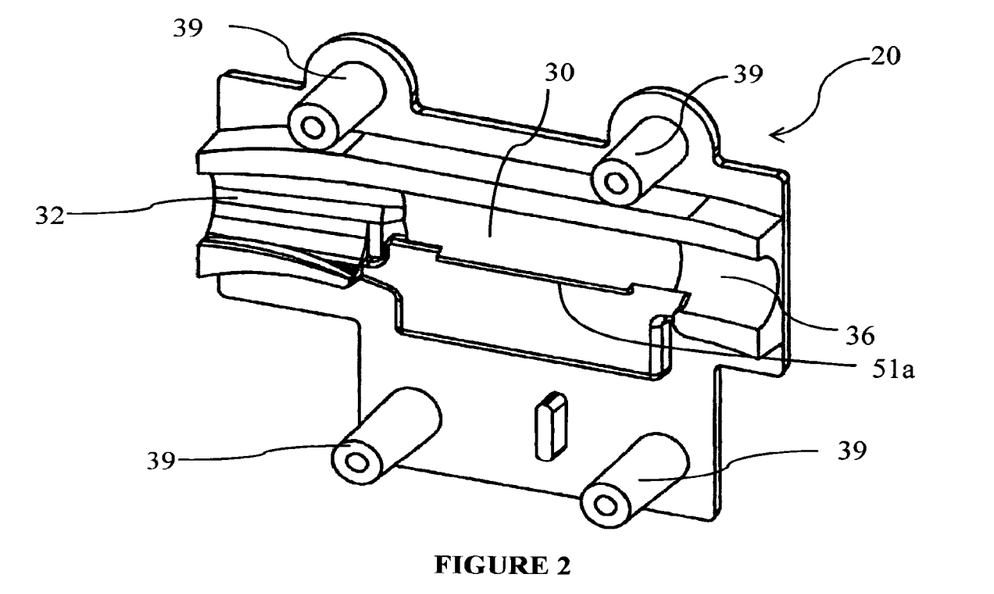
FIG. 2 illustrates the cover portion of the said device removed from the body, wherein the removable components have not yet been inserted into the body.
Figure 5:
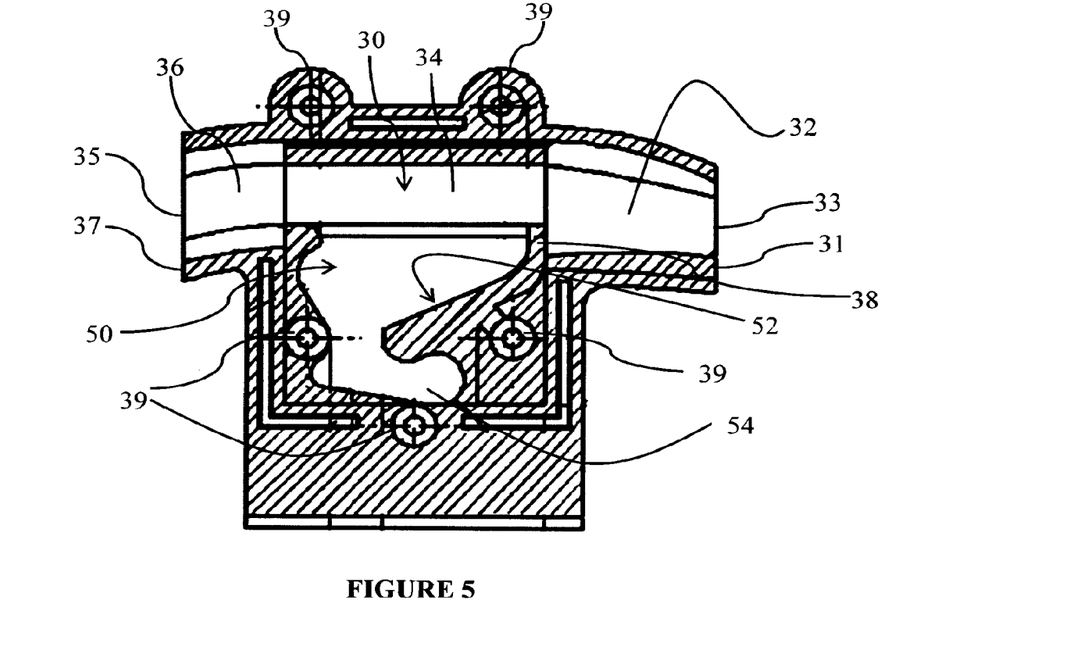
FIG. 5 presents the details of the cable passage way of one embodiment of the device.
Figure 6:
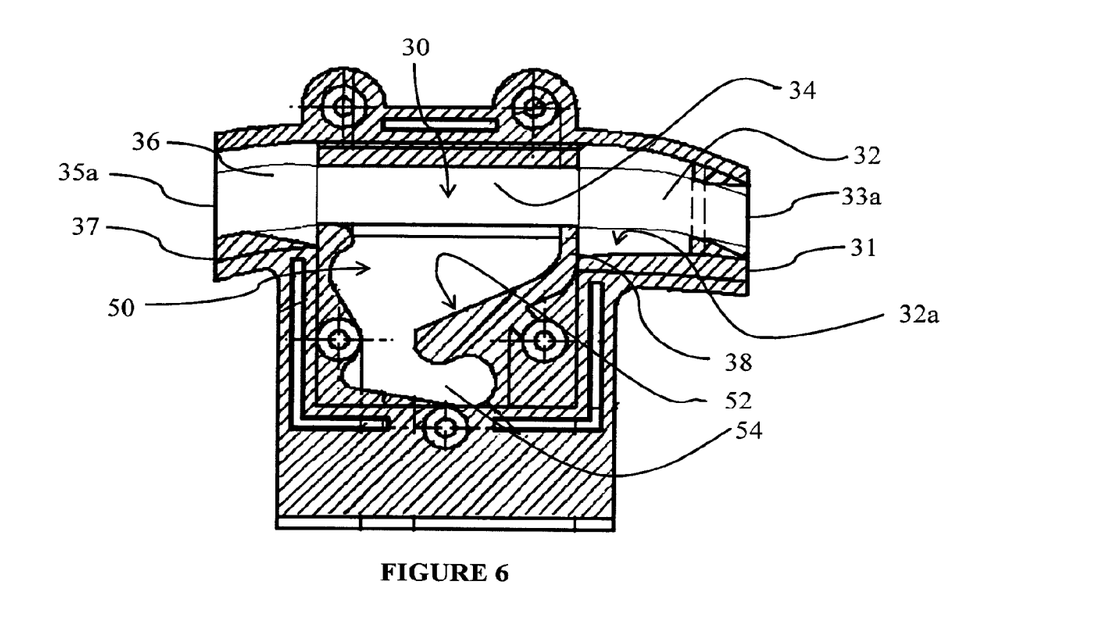
FIG. 6 reveals the details of the cable passage way of another embodiment of the cable lock and seal device.
Figure 7:
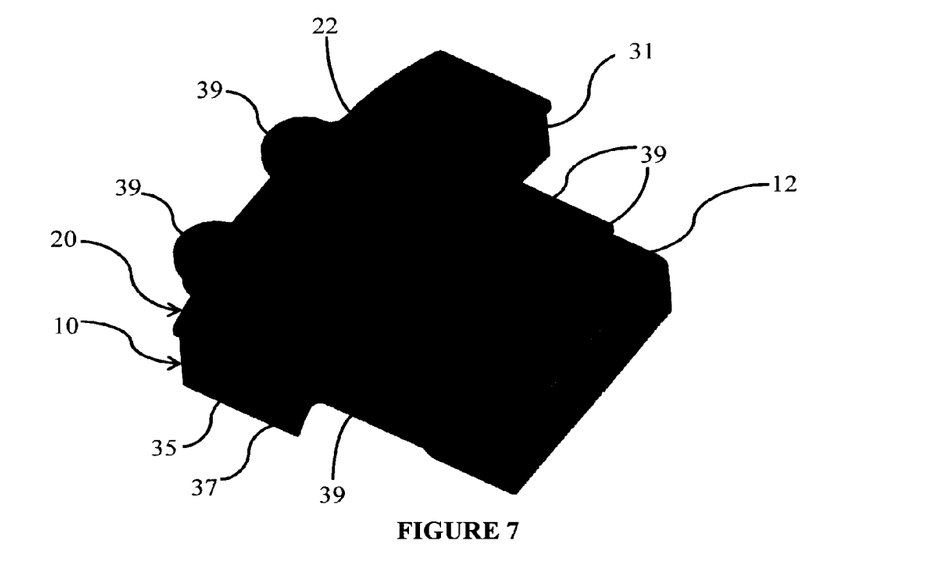
FIG. 7 shows an assembled cable lock and seal device according to our invention.

The cover (20) may be affixed onto the body (10) by a plurality of fastening means distributed to provide a strong connection between the cover (10) and the body (10) such as that illustrated by 4 distributed rivet points (39) in FIG. 1 and FIG. 2 in one embodiment and 5 distributed rivet points (39) in FIG. 5 to FIG. 7. The passage (30) is provided through the breadth of the device block such that the linear passageway is defined between an ingress opening (33) provided on one side and an egress opening (35) on the other side, the linear passageway thus traverses the cable lock and seal device body in order to allow the cable (14) to be inserted to transfix the breadth of device body.

The chamber (50) provided within the device is generally adapted to accommodate a biasing means for urging a locking wheel up a ramp (52) towards the cable passage (30). The ramp (52) is formed as a side of the chamber in the form of a wall rising towards the passage (30). A slot (54) is provided for retaining a first end of a biasing means (56) is provided in the chamber (50). FIG. 1 and FIG. 2 show different slot configurations being provided for holding the first end of different leaflet spring design used as the biasing means (56, 58). The free end of the spring is shown as engaging the locking wheel (53) and urging it up the ramp against and/or into the passage (30).

Figure 3:
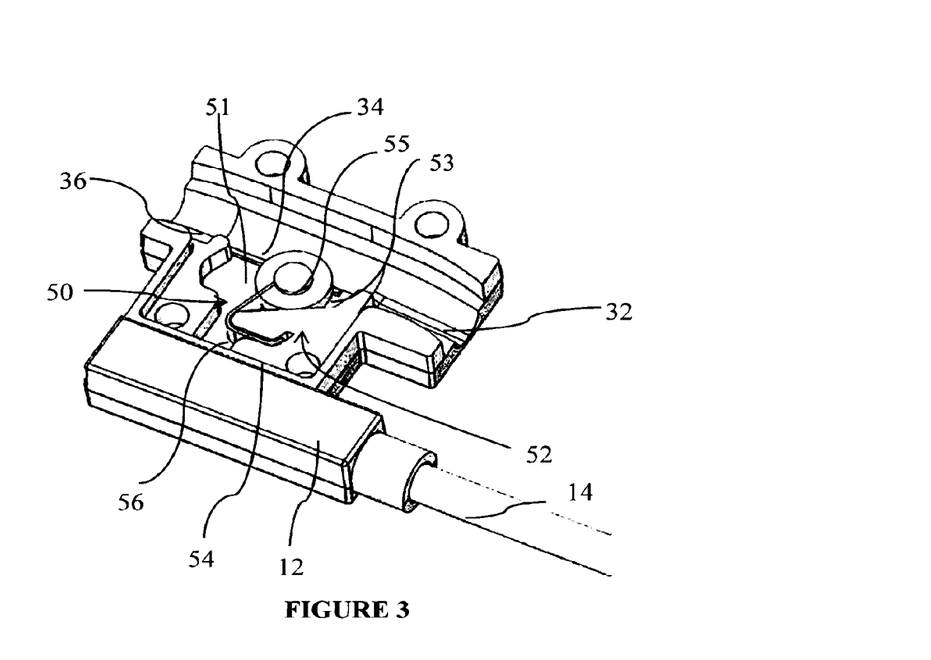
FIG. 3 indicates another embodiment of the open body of our cable lock and seal device with the components of the locking mechanism installed.
Figure 4:
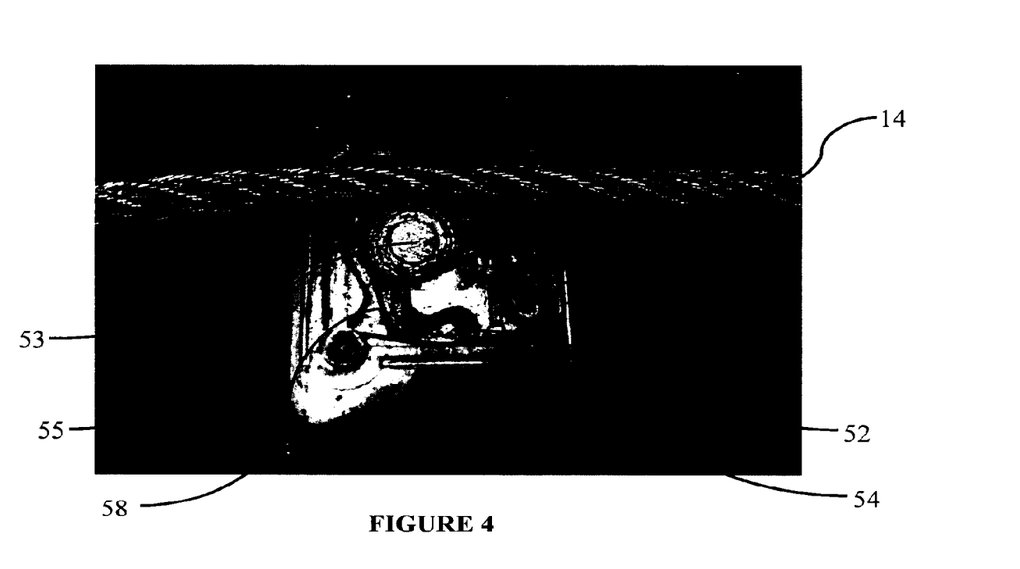
FIG. 4 displays one embodiment of our device with the cable inserted into the passage way and engaged therein by the locking mechanism.

FIG. 3 and FIG. 4 wherein the internal components such as the locking wheel (53) and the biasing means in form of an L-shaped leaf spring (56) or looped leaf spring (58) have been inserted into slot (54) chamber (50). The locking wheel (53) is provided with an axle (55) which may serve to guide or limit the wheel rotational movement. A rib (51) is provided on at least one side of the chamber wall such that the upward rotational movement of the locking wheel (53) is restrained and arrested upon the locking wheel's axle (55) engages the rib (51). For a more balanced guide and engagement of the locking wheel (53), the rib (51) may preferably be provided in a pair, i.e. on both sides of the chamber wall, i.e. distributed one each side of the chamber—on the body (10) at 51 and on the cover (20) at 51*a*.

Although it is shown on both FIG. 3 and FIG. 4 that the rib (51, 51*a*) is provided on the chamber wall immediately below the passage 30, it could be seen that the position of the rib (51) may be varied or lowered in relation to the ramp (52) such that the narrowing of the space between the rib and the ramp (52) may be adjusted to arrest the axle (55) at a position with the desired amount of the locking wheel periphery encroached into the passage (30). When the cable (14) is pushed forward down the passage (30), the locking wheel (53) is pushed against the leaf spring (56, 58) and down the ramp (52), thereby disengaging from the cable (14) in the passage (30) and leaving it unobstructed. Thus, the withdrawal of the locking wheel (53) from the passage (30) unlocks the cable and allows for its continual insertion through the passage (30).

As the locking wheel is biased against the passage (30) by leaf spring (56 or 58), the amount of encroachment into the passage may be pre-determined by the force exerted on the locking wheel (53) by the spring that is necessary to engage and immobilize the cable (14) to lock it as it is pulled backwards or reversing the direction of insertion of the cable (14) in an attempt to withdraw it from the passage (30). The withdrawal of the cable (14) by reversing its direction of insertion would result in frictional engagement of the locking wheel (53) whereby the locking wheel (53) would be urged up the ramp to encroach into the passage (30) and engage to lock the cable from further withdrawal by reverse insertion.

A preferred embodiment of our cable lock and seal device is to provide the passage (30), which traverses the breadth of the device's body-and-cover block, in an inwardly curved pathway as shown in FIGS. 1-7. As the cable (14) has a natural tendency to straighten out when bent, the inward curvature of the pathway imposes a bending deflection bias by the cable (14) against the locking wheel (53), thus providing a firmer locking engagement. The inwardly curved pathway of the passage (30) is preferably linearly or sequentially comprised of a curved ingress passageway (32), followed by a straight passageway (34) and a curved egress passageway (36). As shown in FIG. 1 to FIG. 7, the curved ingress (32) and egress (36) passageways may be embodied or encased in the form of ingress spout (31) and egress spout (37) extending respectively from the device body. Although the ingress and egress spouts may be encased within an enlarged device body instead of spout extensions, such device design would not be compact and would require more material to make up the device body.

With reference to FIG. 5, the ingress opening (33) and ingress passageway (32) may be provided with a diameter significantly larger than the cable (14) diameter such that the transfixing of the cable through the curved passage (30) leaves a wide tolerance of peripheral space before a vertical wall (38) projects from the lower portion of the ingress passageway (32) constricts the diameter to the straight passageway (34) to just fit the cable (14). A more preferred embodiment is shown in FIG. 6 whereby the ingress opening (33a) is adapted to provide an opening which diameter has marginal tolerance for the insertion of the cable (14) but otherwise with wide tolerance in the remaining ingress passageway (32a).

Entry to the straight passageway (34) is preferably marked by an abrupt narrowing of the wide tolerance to a marginal tolerance to admit the cable (14) diameter. This abrupt narrowing at the passageway may be achieved or defined by a vertical wall (38) projecting from the lower periphery of the entrance to the straight passageway (34). The adaptations for narrowing down the ingress opening (33a) and the entrance to the straight passageway (34) create an intermediate void or space (32a) in the ingress passageway (32). This space (32a) might enable a pick inserted from the ingress entrance (33a) to be deflected and trapped thereinto instead of being guided along into the straight passageway (34). Thus, with this trap space (32a), it would be much more difficult for the cable lock and seal device to be tampered with by picking to reach the locking wheel (53) in the straight passageway (34).

Figure 8A:
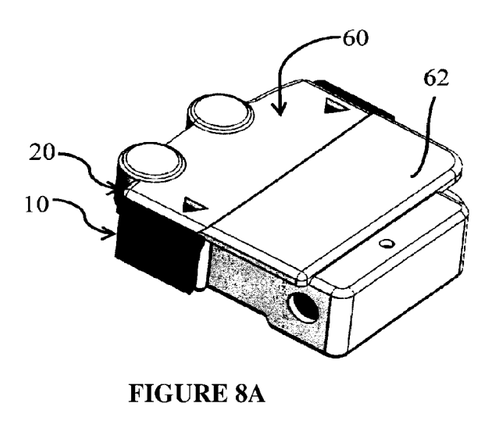
FIG. 8A illustrates a front view of one embodiment whereby an outer sheath is provided over the cable lock and seal device.
Figure 8B:
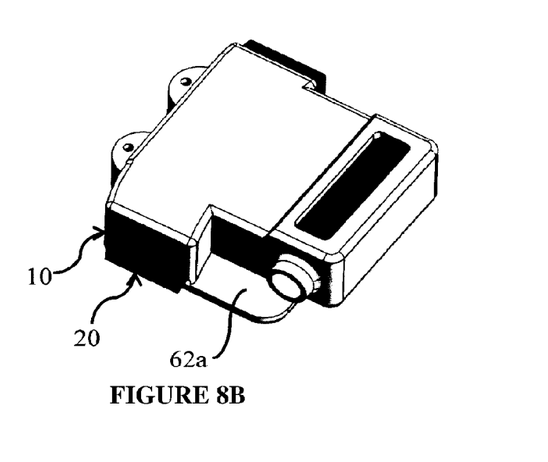
FIG. 8B illustrates a back view of one embodiment whereby an outer sheath is provided over the cable lock and seal device.

Another aspect of our cable lock and seal device is providing a sheath over the cable lock and seal device after the body (10) and cover (20) have been secured together with the locking mechanism assembled inside. As previously described, conventional fastening means (39) such as riveting or bolting may be used to securely fasten the cover (20) to the body (10) upon which the cover-on-body device would appear as in FIG. 7. For ease of manufacture, the device block may be cast from a suitable metal or metal alloy such as zinc (Zn) or zinc alloy. The device may be provided with indentation (20) such as that shown formed on the cover. Tracking devices such as a transmitter, radio frequency identification (RFID) or near-field communication (NFC) microchip may be embedded in the indented space before the device is moulded over with a polymeric sheath (60) upon which the cable lock and seal device will appear as shown in FIG. 8, which comprises FIG. 8A and FIG. 8B, which shows the front and back views of the sheathed device.

The polymeric sheath (60) moulded over the device also prevents access to the fastening means, such as rivets or bolting, that secures the cover (20) to the body (10 of the device in addition to providing a more rectangular shape to the lock and seal device by reducing the ingress and egress spouts projections. The sheath moulding may also be designed such that suitable surfaces are provided for labeling in addition to the colour of the polymeric material used being taken for identification or categorizing purposes, besides securing tracking devices such as transmitter, RFID, NFC and like microchips to the lock and seal device in the indentation (22) as described above. To reduce consumption of polymeric material, one side of the device to be moulded may be designed to be rectangular or with broad surface (62) to provide space for labeling as shown in FIG. 8A whereas the other side may be reduced to "shrink-wrap" the device as per its metallic device body as shown in FIG. 8B. From FIG. 8B's view, it may be seen that, to achieve the rectangular broad surface (62) on the front side, certain areas may be moulded as a flange (62a) rather than in solid.

Figure 9:
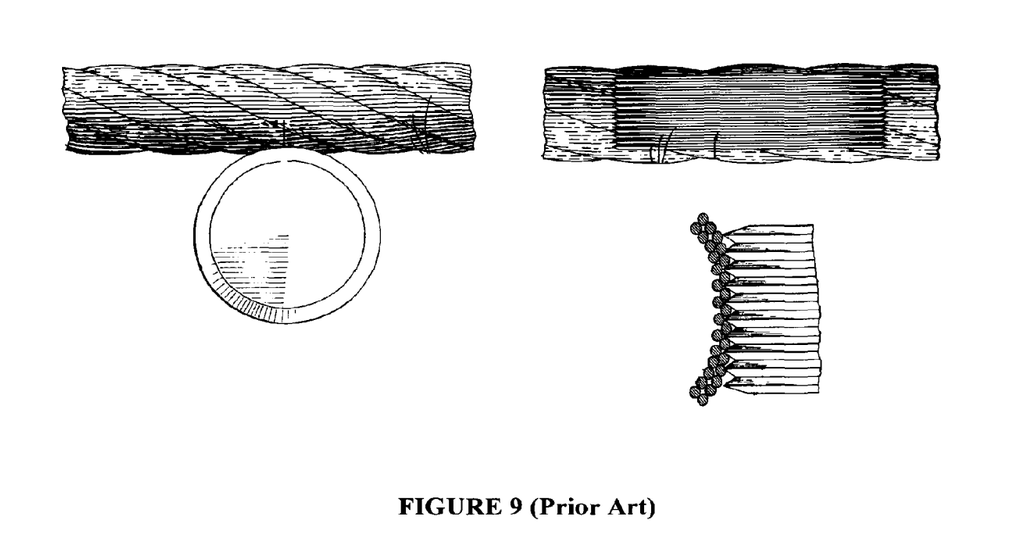
FIG. 9 (Prior Art) indicates a conventional locking wheel configuration in engaging the cable.

Another aspect of our device concerns the teeth design or configuration of the locking wheel (53). A preferred embodiment of our locking wheel design is to configure its teeth to engage the corresponding cable surface profile. As shown in FIG. 9 (Prior Art), the cable may be formed of a primary braiding of steel threads or filaments in a single bundle forming the cable. In this example of prior art, taken from U.S. Pat. No. 4,640,538 (Brammall), the locking wheel may be provided with uniform teeth to engage the threads comprising the cable. In another prior art, taken from U.S. Pat. No. 6,131,969 (Natkins) shown in FIG. 10 (Prior Art), the teeth are configured in a caliper gauge-like tooth pair in a row.

Figure 10:
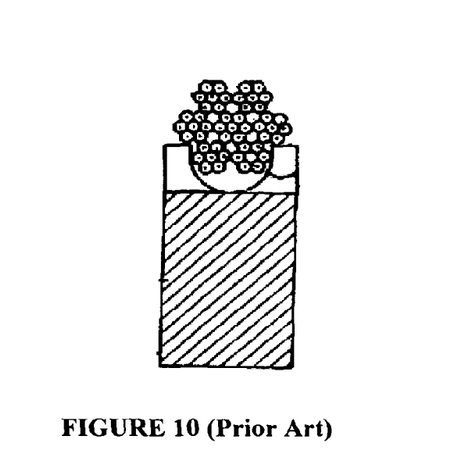
FIG. 10 (Prior Art) exemplifies a prior art cable engaging teeth configuration in locking the cable.
Figure 11A:
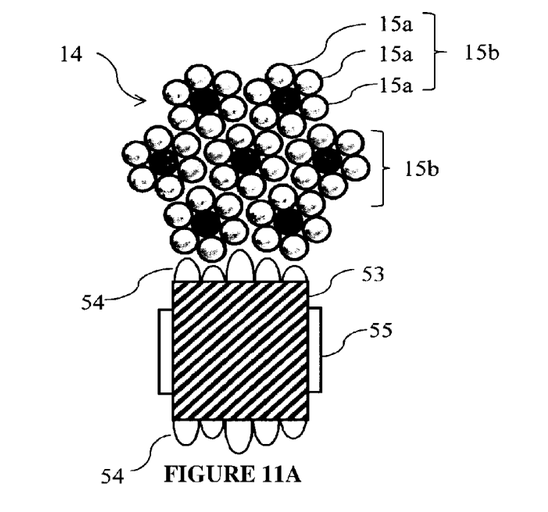
FIG. 11A illustrates a teeth configuration of a variation of a locking wheel.
Figure 11B:
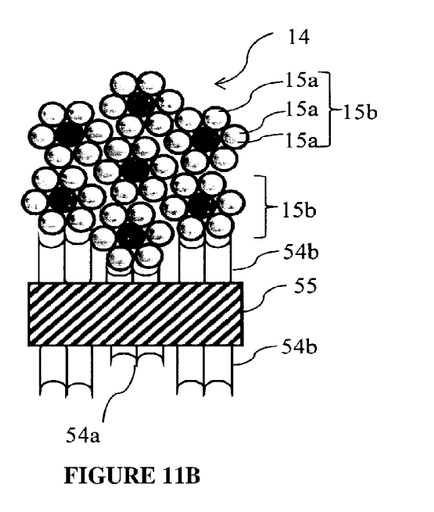
FIG. 11B illustrates a teeth configuration-of another variation of a locking wheel.
Figure 12A:
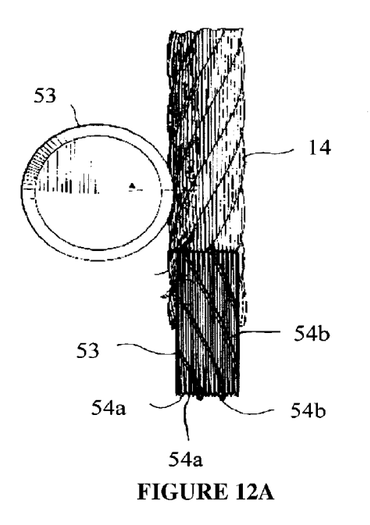
FIG. 12A presents another teeth configurations of another locking wheel.
Figure 12B:
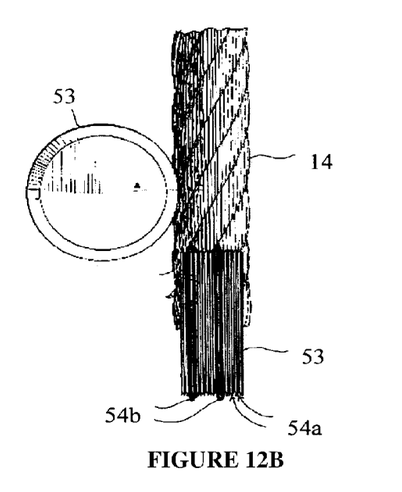
FIG. 12B presents another teeth configurations of another locking wheel.

The cable's surface profile may also comprise of individual strands or threads (15a) that are braided at a primary level into a bundle (15b) and a plurality of such bundles (15b) are then braided at a secondary level to form the cable (14) as shown in FIGS. 10, 11 and 12. Details of the cross-sectional views of such primary and secondary braided cables are shown in FIG. 11. Our cable lock and seal device may be assembled with a locking wheel (53) which teeth configuration is adapted for engaging the inserted cable's longitudinal surface profile. This include providing the teeth configuration in a combination of small or short teeth (54a) to engage inter-strand or inter-thread space and large or long teeth (54b) to engage inter-bundle space as illustrated in FIG. 11 and FIG. 12. It should also be noted that the shape of the teeth may be pointed or sharp to claw into the threads. Alternatively, the tip of the tooth may be provided in the shape of a groove to fit a thread or adapted to fit a bundle accordingly. As shown in FIG. 12, the large or long teeth (54b) may be provided in many configuration to suit the inter-bundle space of the cable (14). Hence, in this embodiment, our locking wheel may be chosen according to its teeth configuration to adapt to the particular type of cable braiding prior to or during the device's assembly.

Many of the afore-described features and embodiments of our cable lock and seal device are capable of variations, modifications or adaptation which a person skilled in the art would be able to modify or improvise accordingly and which may not have been specifically described or proposed herein. There may also be many other alternative or optional features that may be used in conjunction with or supplement to our device which may not have been described or suggested. These variations, adaptions and modifications or their equivalents are to be understood as encompassed within the scope and letter of the claims defined hereinafter.

What I claim as our invention is defined as follows:

1. A cable lock and seal device comprising:
a body and a cover which, complementarily forms a block enclosing there within at least a passage and a chamber, wherein
   said body is integral with an anchor block in which one end of a cable is permanently anchored, and the other end of the cable being free to be inserted into the passage;
   said passage traverses the assembled body-and-cover block in an upwardly curved pathway;
   said chamber is adapted with
      a ramp rising towards said passage;
      a slot for retaining a first end of
      a biasing means which second end is disposed to urge
      a locking wheel up the ramp against said passage, wherein said locking wheel has an axle;
   a rib is provided along the lower wall of passage (30) proximal to the top end of ramp on at least the body or cover, wherein the urging of the locking wheel by the biasing means up the ramp is restrained when the locking wheel's axle engages said rib and limiting said locking wheel's further entry into the passage while engaging said cable and preventing its withdrawal,
   wherein the insertion of the cable into the passage pushes the locking wheel down the ramp against the biasing means thereby disengaging the passage and unlocking and allowing for the continued insertion of said cable,
   wherein an attempt to withdraw the cable engages the locking wheel as it is urged up the ramp by the biasing means and encroaches into the passage thereby preventing the cable from being withdrawn.

2. The cable lock and seal device according to claim 1 wherein the upwardly curved pathway of the passage is linearly comprised of a curved ingress passageway, followed by a straight passageway and a curved egress passageway.

3. The cable lock and seal device according to claim 2 wherein the ingress passageway has an intermediate portion which diameter is larger than that of the cable diameter, creating an intermediate void or trap space.

4. The cable lock and seal device according to claim 3 wherein the ingress passageway is adapted such that the ingress passageway has a first diameter allowing for the ease of passage of the cable and a second ingress passageway has a second diameter larger than said cable diameter up to the straight passageway where it is abruptly narrowed to a third diameter allowing for ease of passage of said cable diameter.

5. The cable lock and seal device according to claim 4 wherein the abrupt narrowing of the passageway at an entrance to the straight passageway is defined by a vertical wall projecting from the lower periphery of the opening to the straight passageway.

6. The cable lock and seal device according to claim 1 wherein an indentation for embedding an electronic tracking means is provided on an external surface of the assembled device.

7. The cable lock and seal device according to claim 6 wherein a sheath is formed by moulding a layer of polymeric material over a substantial portion of said device body which wraps over and embeds the electronic tracking means thereunto.

8. The cable lock and seal device according to claim 1 wherein the locking wheel circumference surface is configured with teeth to engage corresponding cable's longitudinal surface profile.

9. The cable lock and seal device according to claim 8 wherein the locking wheel teeth configuration comprises a combination of small teeth (54a) distributed to engage inter-strands and large teeth distributed to engage inter-bundles of the cable.

* * * * *